United States Patent
Wisniewski

(10) Patent No.: US 8,042,632 B2
(45) Date of Patent: Oct. 25, 2011

(54) CREEP MODE PROPULSION FOR STOP-START HYBRID VEHICLES

(75) Inventor: Brad W. Wisniewski, Clarkston, MI (US)

(73) Assignee: GM Global Technology Operations LLC

(*) Notice: Subject to any disclaimer, the term of this patent is extended or adjusted under 35 U.S.C. 154(b) by 296 days.

(21) Appl. No.: 12/316,023

(22) Filed: Dec. 9, 2008

(65) Prior Publication Data

US 2010/0089673 A1 Apr. 15, 2010

Related U.S. Application Data

(60) Provisional application No. 61/105,605, filed on Oct. 15, 2008.

(51) Int. Cl.
*B60W 10/06* (2006.01)
*B60W 10/08* (2006.01)

(52) U.S. Cl. .................. 180/65.265; 180/65.6; 903/930; 701/53; 701/70

(58) Field of Classification Search ............... 180/65.21, 180/65.24, 65.245, 65.265, 65.6, 65.7; 903/930, 903/946; 701/22, 53, 54, 70
See application file for complete search history.

(56) References Cited

U.S. PATENT DOCUMENTS

| | | | | |
|---|---|---|---|---|
| 6,684,970 | B2* | 2/2004 | Gotou | 180/65.225 |
| 7,359,785 | B2* | 4/2008 | Yoshida et al. | 701/53 |
| 7,490,685 | B2* | 2/2009 | Aoki et al. | 180/65.28 |
| 7,516,007 | B2* | 4/2009 | Tamai et al. | 701/70 |
| 7,561,954 | B2* | 7/2009 | Aizawa et al. | 701/79 |
| 7,854,282 | B2* | 12/2010 | Lee et al. | 180/65.24 |
| 2005/0143877 | A1* | 6/2005 | Cikanek et al. | 701/22 |
| 2007/0227791 | A1* | 10/2007 | Ueno | 180/65.2 |

* cited by examiner

*Primary Examiner* — John Walters

(57) ABSTRACT

A control module including a traffic determination module that determines when a vehicle is in traffic and that selectively generates a traffic signal. The control module also having a creep enable module that generates a creep enable signal based on the traffic signal. The control module further including a power control module that selectively generates an internal combustion engine (ICE) disable signal. The power control module also commands a motor generator unit to produce power based on the creep enable signal as a driver reduces brake pedal pressure.

18 Claims, 4 Drawing Sheets

CREEP MODE PROPULSION FOR STOP-START HYBRID VEHICLES

CROSS-REFERENCE TO RELATED APPLICATIONS

This application claims the benefit of U.S. Provisional Application No. 61/105,605, filed on Oct. 15, 2008. The disclosure of the above application is incorporated herein by reference.

FIELD

The present disclosure relates to electric machines, and more particularly to control systems and methods for a motor generator unit in a hybrid vehicle.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Hybrid powertrains typically include a first torque generator, such as an internal combustion (ICE), and a second torque generator, such as an electric machine (EM). Both may provide torque to a driveline to propel a vehicle. In a full hybrid powertrain, the EM may drive the drivetrain directly, without transferring torque through a component of the ICE. In a mild hybrid powertrain, the EM may be coupled with the ICE through the accessory drive, and torque generated by the EM is transferred to the drivetrain through the ICE. An exemplary mild hybrid powertrain includes a belt alternator starter (BAS) system. In the BAS system, the EM is coupled to the ICE via a belt and pulleys. Other accessory components, such as pumps and compressors, may be powered by the belt or additional belts attached to one of the pulleys. Alternatively, the other accessory components may be driven by electric power.

Referring now to FIG. 1, a functional block diagram of a hybrid powertrain of a vehicle is presented. The hybrid powertrain includes an internal combustion engine (ICE) 102, a motor generator unit (MGU) 104, an inverter 106, a hybrid battery 108, and an accessory power module (APM) 110. The APM 110 provides power to a 12V battery 114 and 12V vehicle loads 116.

The inverter 106 converts power between the DC voltage of the hybrid battery 108 and the electrical power produced by the MGU 104. The DC voltage of the hybrid battery 108 may be 42 volts in the current hybrid systems and may be 118 volts in the next generation of BAS hybrids. The APM 110 converts power from the DC voltage of the hybrid battery 108 into a standard vehicle voltage, such as 12 volts. By using the APM 110, the 12V vehicle loads 116 do not need to be redesigned to work with the higher voltage of the hybrid battery 108.

The ICE 102 and the MGU 104 may be coupled via a belt 120 encircling pulleys 122 and 124 of the ICE 102 and the MGU 104, respectively. The combined torque of the ICE 102 and the MGU 104 propel the vehicle. When more propulsion torque is desired than the ICE 102 is currently producing, the MGU 104 may be used as a motor to provide additional torque.

At times when the ICE 102 is producing more torque than is required, the MGU 104 may function as a generator, providing power to the hybrid battery 108. In addition, during regenerative braking, the MGU 104 may function as a generator, slowing the vehicle while providing electrical power to the hybrid battery 108.

SUMMARY

A control module including a traffic determination module that determines when a vehicle is in traffic and that selectively generates a traffic signal. The control module also having a creep enable module that generates a creep enable signal based on the traffic signal. The control module further includes a power control module that selectively generates an internal combustion engine (ICE) disable signal. The power control module also commands a motor generator unit to produce power based on the creep enable signal as a driver reduces brake pedal pressure.

A method including the steps of determining when a vehicle is in traffic and selectively generating a traffic signal, generating a creep enable signal based on the traffic signal, and selectively generating an internal combustion engine (ICE) disable signal and commanding a motor generator unit to produce power based on the creep enable signal as a driver reduces brake pedal pressure.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
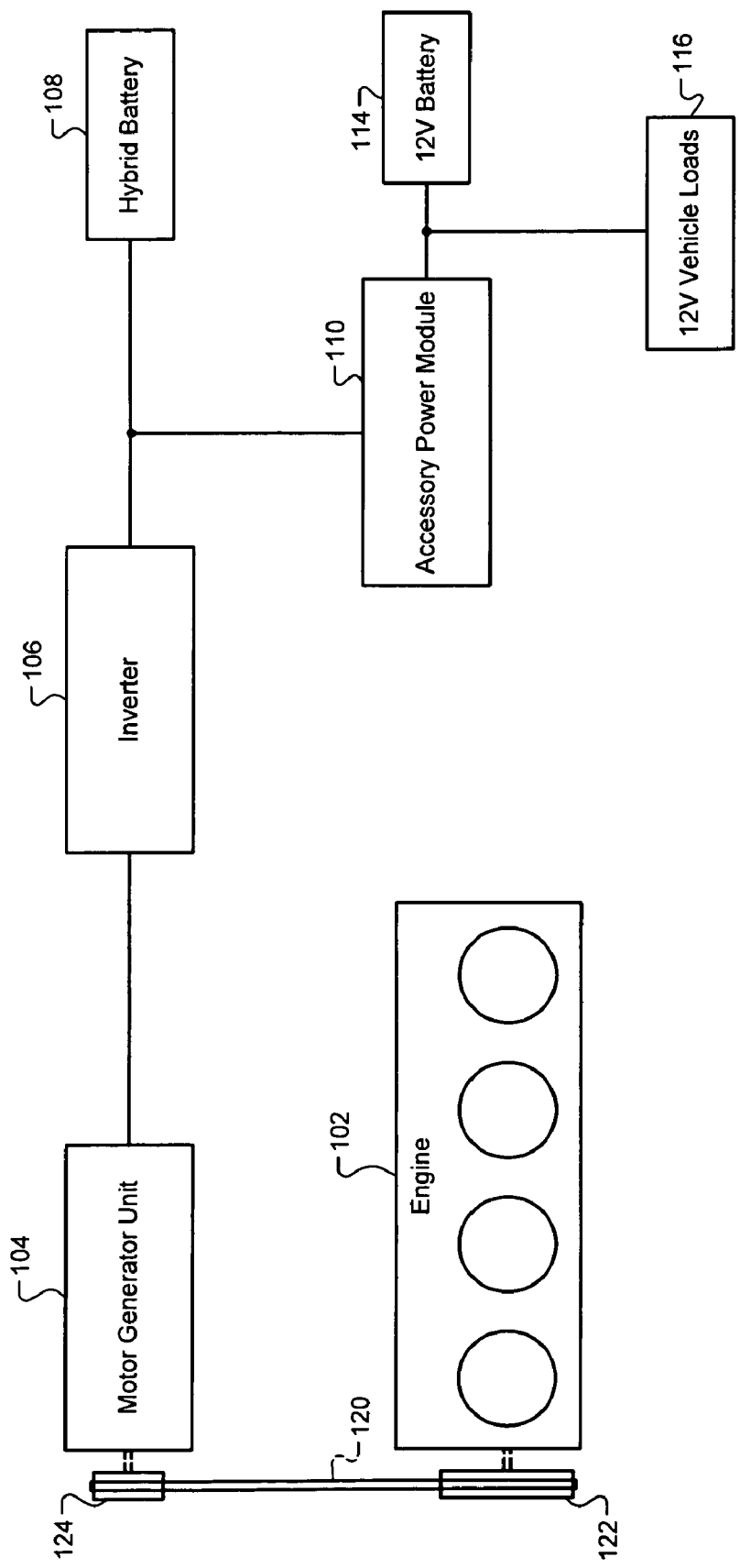
FIG. 1 is a functional block diagram of a hybrid powertrain of a vehicle according to the prior art.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

When a driver applies the brakes and comes to a stop in a mild hybrid vehicle, the ICE normally shuts off. A motor generator unit (MGU) operates on battery power and provides power to the vehicle accessories when it recieves power and rotates at a predetermined speed. When the driver reduces the brake pedal pressure, the MGU restarts the ICE to allow the vehicle to accelerate.

A hybrid control module may determine when a vehicle is in heavy traffic. For example only, the hybrid control module may determine that the vehicle is in heavy traffic based on a number of successive stop-starts within a predetermined period. When the hybrid control module determines that the vehicle is in heavy traffic, a creep mode may be enabled. When the creep mode is enabled and the driver reduces the brake pedal pressure, the vehicle may be propelled by the MGU rather than the ICE. The ICE may remain off, which may reduce emissions and increase fuel economy. If the driver presses the accelerator pedal, the ICE may be restarted by the MGU and the creep mode may be disabled.

When the creep mode is enabled, the hybrid control module may command the torque converter clutch to lock, making the transmission input shaft rotate at the same speed as the crankshaft in the ICE. Locking the torque converter clutch prevents power losses that occur when the impeller and the turbine inside of the torque converter are allowed to slip.

In the creep mode, the hybrid control module may also shift the transmission from a first gear to a second higher gear. This shift may be performed while the vehicle is stopped. By engaging the second higher gear, the speed of the MGU necessary to achieve a given vehicle speed may be reduced. Reducing the speed of the MGU may reduce the amount of power consumed by the MGU. To effectuate shifts without the ICE running, an auxiliary transmission oil pump may be used to provide hydraulic pressure.

When the driver reduces the brake pedal pressure, the hybrid control module may command the MGU to accelerate up to a predetermined speed to propel the vehicle. The MGU may increase in speed at a predetermined rate to provide smooth acceleration. For example only, the MGU speed increase may mimic the acceleration of an ICE with an automatic transmission as the driver removes pressure from the brake pedal.

Figure 2:
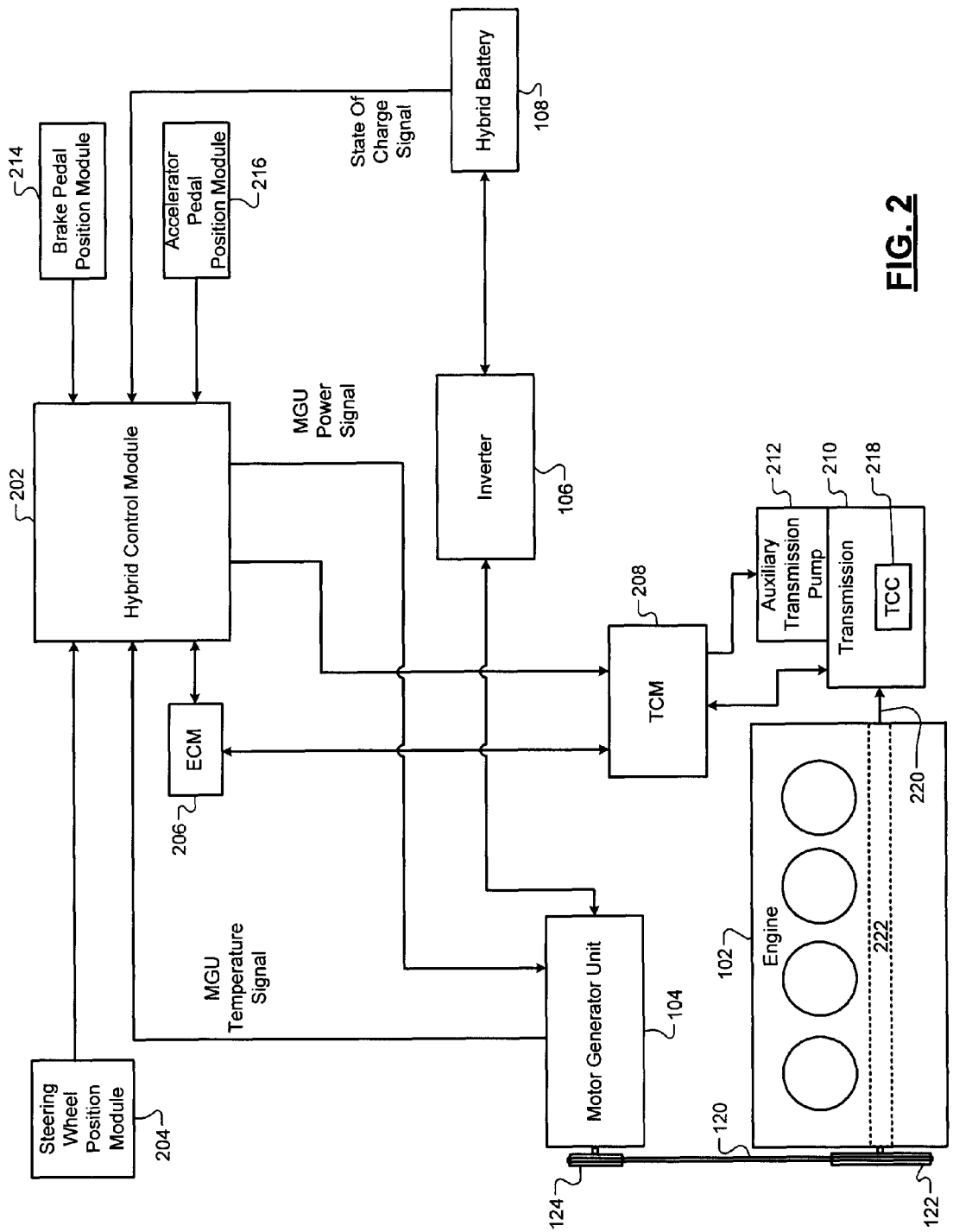
FIG. 2 is a functional block diagram of an exemplary hybrid powertrain that operates a motor generator unit according to the principles of the present disclosure.

Referring now to FIG. 2, a functional block diagram of an exemplary hybrid powertrain is presented. The hybrid powertrain includes a hybrid control module 202 that controls the MGU 104. The hybrid control module 202 may be included in or in communication with an engine control module (ECM) 206. The ECM 206 may control various operating parameters of the ICE 102. Similarly, a transmission control module (TCM) 208 may control various operating parameters of an automatic transmission 210 and an auxiliary transmission pump 212.

The hybrid control module 202 controls the MGU 104 using an MGU power signal. When the MGU power signal is positive, the MGU 104 may operate as a motor, providing positive torque to the ICE 102. The MGU 104 is powered via the inverter 106 by the hybrid battery 108. The inverter 106 may also selectively control operation of the MGU 104. When the MGU power signal is negative, the MGU 104 operates as a generator, converting rotational torque into electric power. The inverter 106 outputs the electric power to the hybrid battery 108.

The hybrid control module 202 may control operation of the MGU 104 based on multiple signals. For example only, the hybrid control module 202 may receive a steering wheel position signal from a steering wheel position module 204. The hybrid control module 202 may receive a brake pedal position (BPP) signal from a brake pedal position module 214 to determine when brake pedal pressure is changing. The hybrid control module 202 may receive an accelerator pedal position (APP) signal from an accelerator pedal position module 216. The hybrid control module 202 may also receive a state of charge signal from the hybrid battery 108, an MGU temperature signal from the MGU 104, and a vehicle speed signal from the ECM 206.

Figure 3:
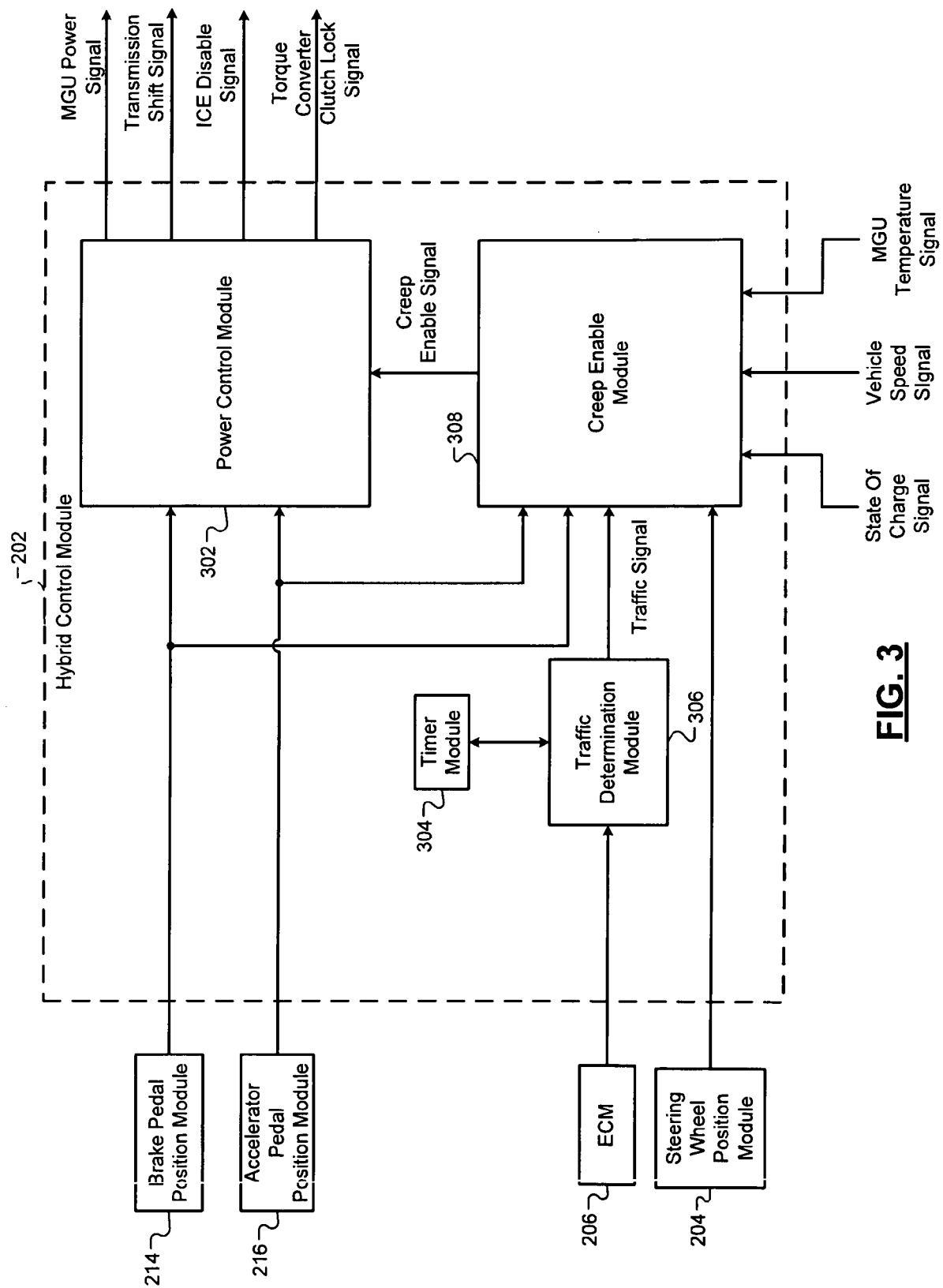
FIG. 3 is a functional block diagram of an exemplary hybrid control module according to the principles of the present disclosure.

With reference to FIG. 3, a functional block diagram of an exemplary hybrid control module is presented. The hybrid control module 202 may include a power control module 302, a timer module 304, a traffic determination module 306, and a creep enable module 308. The traffic determination module 306 may selectively receive a signal from the ECM 206 when the ICE 102 is turned off. The timer module 304 may enable a timer (not shown) when the traffic determination module 306 receives the signal from the ECM 206.

If the traffic determination module 306 determines that the ICE 102 has been turned off and on a predetermined number of times within a predetermined period, a traffic signal may be selectively generated. The traffic determination module 306 may also selectively generate the traffic signal based on a percentage of time that the vehicle is stopped. When the percentage is within a predetermined range, the traffic signal may be generated, for example only.

Alternatively, the traffic determination module 306 may selectively generate the traffic signal based on an adaptive cruise control signal from the ECM 206. For example only, the adaptive cruise control signal may provide information that may be used by the traffic determination module 306 to determine the distance from other vehicles on a road. When the distance is less than a predetermined threshold for a predetermined period, the traffic signal may be selectively generated.

The creep enable module 308 may evaluate additional signals to determine whether the creep mode may be enabled when the traffic signal is received. For example only, the creep enable module 308 may determine whether the steering wheel angle is less than a predetermined angle based on a signal from the steering wheel position module 204. The creep enable module 308 may determine whether the hybrid battery 108 charge is sufficient to propel the vehicle. The creep enable module 308 may also determine whether a temperature of the MGU 104 and a temperature of the hybrid battery 108 are within a predetermined range. After the additional signals have been evaluated, the creep enable module 308 may selectively generate a creep enable signal. The creep enable signal may be selectively canceled when a speed of the vehicle exceeds a threshold speed, for example only.

The power control module 302 may receive the creep enable signal and selectively disable the ICE. The power control module 302 may selectively generate an MGU power signal based on the creep enable signal when the driver begins to release the brake pedal. The power control module 302 may selectively cancel the MGU power signal when the accelerator pedal is depressed. The power control module 302 may cancel the ICE disable signal when the accelerator is depressed, allowing the ICE 102 to restart.

The power control module 302 may also selectively generate a torque converter clutch (TCC) lock signal and a transmission shift signal when the creep enable signal is generated. Based on the TCC lock signal, the TCM 208 may command a TCC 218 to lock. Locking the TCC 218 makes transmission input shaft 220 rotate at the same speed as a crankshaft 222 in the ICE. Locking the TCC 218 may prevent power losses that occur when an impeller and a turbine inside of a torque converter are allowed to slip.

Based on the transmission shift signal, the TCM 208 may command the transmission 210 to shift from a first gear to a second higher gear. By engaging the second higher gear, the speed of the MGU 104 necessary to achieve a given vehicle speed may be reduced. Reducing the speed of the MGU 104 may reduce the amount of power consumed by the MGU 104. To effectuate the shift with the ICE 102 off, the TCM 208 may command the auxiliary transmission pump 212 to provide hydraulic pressure to clutches (not shown) inside of the transmission 210.

The ECM 206 may prevent the ICE 102 from starting based on the ICE disable signal from the power control module 302 to allow the MGU 104 to propel the vehicle as the driver releases the brake pedal. The ICE 102 may be prevented from starting by continuing not to deliver fuel and spark to the ICE 102, for example only. By disabling the ICE 102 while the MGU 104 propels the vehicle, emissions may be reduced and fuel economy may be increased.

Figure 4:
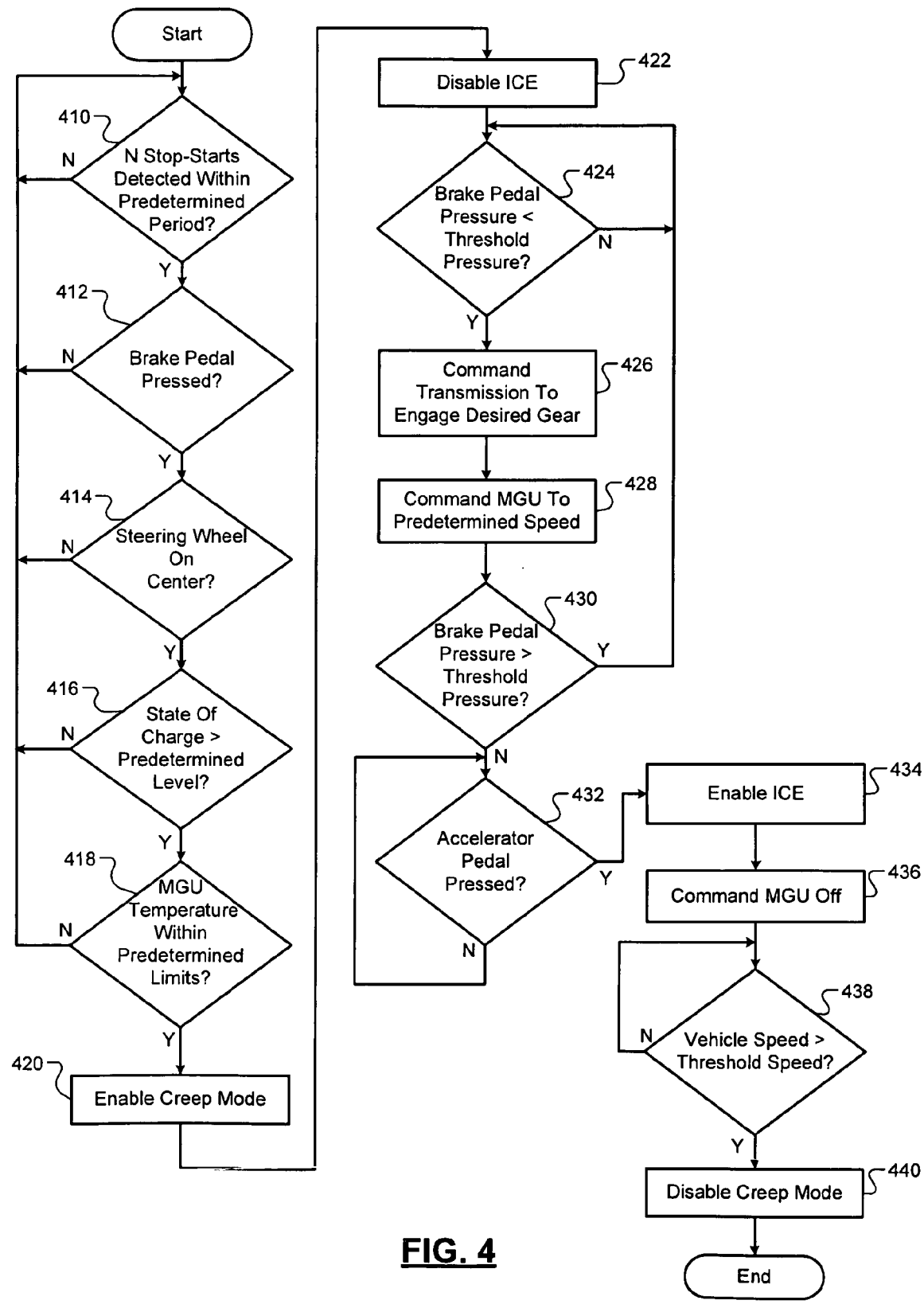
FIG. 4 is a flow diagram depicting exemplary steps performed by the hybrid control module according to the principles of the present disclosure.

With reference to FIG. 4, a flow diagram depicting exemplary steps performed by the hybrid control module is presented. In step 410, control determines whether a predetermined number of stop-start events have occurred within a predetermined time. If so, continues in step 412. If not, control remains in step 410. In step 412, control determines whether the brake pedal is pressed. If so, control continues to step 414. If not, control returns to step 410.

In step 414, control determines whether the vehicle steering wheel is centered. If not, control returns to step 410. If so, control continues in step 416. In step 416, control determines if the hybrid battery charge is greater than a predetermined level. If so, control continues in step 418. If not, control returns to step 410. In step 418, control determines whether the MGU temperature is within predetermined limits. If so, control continues in step 420. If not, control returns to step 410.

In step 420, control enables the creep mode. In step 422, control disables the ICE. In step 424, control determines whether the brake pedal is being released. If so, control continues in step 426. If not, control remains in step 424. In step 426, control commands the transmission to engage a desired gear. In step 428, control commands the MGU to a predetermined speed to propel the vehicle. In step 430, control determines whether the brake pedal is being pressed. If so, control continues in step 424. If not, control continues in step 432.

In step 432, control determines whether the accelerator pedal is being pressed. If so, control continues in step 434. If not, control remains in step 432. In step 434, control enables the ICE. In step 436, control commands the MGU off. In step 438, control determines whether the vehicle speed is greater than a threshold speed. If so, control continues in step 440. If not, control remains in step 438. In step 440, control disables the creep mode and control ends.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A control module, comprising:
   a traffic determination module that determines when a vehicle is in traffic and that selectively generates a traffic signal;
   a creep enable module that generates a creep enable signal based on the traffic signal, a steering wheel angle signal, a motor generator unit temperature signal, and a battery charge signal; and
   a power control module that selectively generates an internal combustion engine disable signal and commands a motor generator unit to produce power based on the creep enable signal as a driver reduces brake pedal pressure.

2. The control module of claim 1 wherein the traffic determination module determines that the vehicle is in traffic when an internal combustion engine of the vehicle is turned off a predetermined number of times within a predetermined period.

3. The control module of claim 1 wherein the creep enable module cancels the creep enable signal when an accelerator pedal is pressed.

4. The control module of claim 1 wherein a transmission control module commands a torque converter clutch to lock based on the creep enable signal.

5. The control module of claim 4 wherein a drive belt couples the motor generator unit to a crankshaft, and wherein the motor generator unit rotates the crankshaft and a transmission input shaft to propel the vehicle.

6. The control module of claim 4 wherein the torque converter clutch is unlocked when the creep enable signal is canceled.

7. The control module of claim 1 wherein the creep enable signal is canceled when a vehicle speed exceeds a predetermined speed.

8. The control module of claim 1 wherein the creep enable module selectively generates a gear shift request based on the traffic signal to up-shift from a first gear to a second higher gear.

9. The control module of claim 1 wherein the motor generator unit is commanded to increase power at calibrated rate based on the creep enable signal.

10. A method, comprising:
    determining when a vehicle is in traffic and selectively generating a traffic signal;
    generating a creep enable signal based on the traffic signal, a steering wheel angle signal, a motor generator unit temperature signal, and a battery charge signal; and
    selectively generating an internal combustion engine disable signal and commanding a motor generator unit to produce power based on the creep enable signal as a driver reduces brake pedal pressure.

11. The method of claim 10 wherein the determination is based on a predetermined number of times that the internal combustion engine is turned off within a predetermined period.

12. The method of claim 10 wherein the creep enable signal is canceled when an accelerator pedal is pressed.

13. The method of claim 10 wherein a transmission control module commands a torque converter clutch to lock based on the creep enable signal.

14. The method of claim 13 wherein a drive belt couples the motor generator unit to a crankshaft, and wherein the motor generator unit rotates the crankshaft and a transmission input shaft to propel the vehicle.

15. The method of claim 13 wherein the torque converter clutch is unlocked when the creep enable signal is canceled.

16. The method of claim 10 wherein the creep enable signal is canceled when a vehicle speed exceeds a predetermined speed.

17. The method of claim 10 wherein a gear shift request is selectively generated based on the traffic signal to up-shift from a first gear to a second higher gear.

18. The method of claim 10 wherein the motor generator unit is commanded to increase power at calibrated rate based on the creep enable signal.

* * * * *